(12) United States Patent
Dwivedi et al.

(10) Patent No.: US 9,075,251 B2
(45) Date of Patent: Jul. 7, 2015

(54) INTEGRATED PHOTONIC DEVICES WITH REDUCED SENSITIVITY TO EXTERNAL INFLUENCES

(71) Applicants: IMEC, Leuven (BE); Universiteit Gent, Ghent (BE)

(72) Inventors: Sarvagya Dwivedi, Ghent (BE); Wim Bogaerts, Melle (BE)

(73) Assignees: IMEC, Leuven (BE); Universiteit Gent, Ghent (BE)

( * ) Notice: Subject to any disclaimer, the term of this patent is extended or adjusted under 35 U.S.C. 154(b) by 0 days.

(21) Appl. No.: 14/098,117

(22) Filed: Dec. 5, 2013

(65) Prior Publication Data

US 2014/0161384 A1 Jun. 12, 2014

Related U.S. Application Data

(60) Provisional application No. 61/734,042, filed on Dec. 6, 2012.

(51) Int. Cl.
*G02F 1/01* (2006.01)
*G02B 6/293* (2006.01)
(Continued)

(52) U.S. Cl.
CPC ............ *G02F 1/011* (2013.01); *G02B 6/29398* (2013.01); *G02B 6/12007* (2013.01);
(Continued)

(58) Field of Classification Search
CPC ............ G02B 6/12007; G02B 6/1225; G02B 6/29346; G02B 6/29398; G02F 1/011; G02F 1/0136
USPC ........................................................ 385/1, 11
See application file for complete search history.

(56) References Cited

U.S. PATENT DOCUMENTS 6,853,758 B2 * 2/2005 Ridgway et al. .................. 385/2
8,457,453 B2 * 6/2013 Lipson et al. .................... 385/14
(Continued)

FOREIGN PATENT DOCUMENTS

WO    WO 2011108617 A1 *  9/2011

OTHER PUBLICATIONS

Ibrahim, Marc et al., "Athermal Silicon Subwavelength Grating Waveguides", 2011 8th IEEE International Conference on Group IV Photonics (GFP), Sep. 14-16, 2011, pp. 258-260.
(Continued)

*Primary Examiner* — Peter Radkowski
(74) *Attorney, Agent, or Firm* — McDonnell Boehnen Hulbert & Berghoff LLP

(57) ABSTRACT

A photonic device having a wavelength-dependent transmission or filter characteristic, comprising: a Splitter Polarization Rotator (SPR) configured to receive an input wave having a first polarization and outputting a first wave having the first polarization and a second wave having a second polarization different from the first polarization; first and second waveguide arms connected to the SPR configured to propagate the first and second waves respectively; and a Polarization Rotator and Combiner for combining the propagated first and second waves; wherein the dimensions of the first waveguide arm and the second waveguide arm are selected to cancel the influence of an external effect on the wavelength-dependent characteristic. Another aspect of the invention relates to a method for reducing the sensitivity of said integrated photonic device, comprising splitting a polarized light beam, propagating light waves of different through two waveguide arms of specific dimensions, and recombining them.

19 Claims, 12 Drawing Sheets

(51) Int. Cl.
  *G02B 6/12* (2006.01)
  *G02B 6/122* (2006.01)
  *G02B 6/125* (2006.01)
  *G02F 1/21* (2006.01)

(52) U.S. Cl.
  CPC .............. *G02B6/1225* (2013.01); *G02B 6/125* (2013.01); *G02B 6/29347* (2013.01); *G02F 2001/212* (2013.01); *G02F 2203/15* (2013.01); *G02F 2203/21* (2013.01); *G02F 2203/60* (2013.01)

(56) References Cited

U.S. PATENT DOCUMENTS

| | | | |
|---|---|---|---|
| 2003/0081873 | A1 | 5/2003 | Tan et al. |
| 2004/0008916 | A1* | 1/2004 | Ridgway et al. ................. 385/2 |
| 2005/0018949 | A1 | 1/2005 | Yan |
| 2011/0102804 | A1* | 5/2011 | Lipson et al. ................. 356/480 |
| 2011/0142396 | A1 | 6/2011 | Okamoto |
| 2012/0002918 | A1 | 1/2012 | Kawashima et al. |

OTHER PUBLICATIONS

Long, Qifeng et al., "CMOS-Compatible Thermal Compensator Based on a Modified Mach-Zender-Interferometer", Proc. SPIE 8308, Optoelectronic Materials and Devices VI, 83081L, Nov. 28, 2011, 5 pages.

Raghunathan, Vivek et al., "Athermal Operation of Silicon Waveguides: Spectral, Second Order and Footprint Dependencies", Opt. Express, vol. 18, 2010, pp. 17631-17639.

Ibrahim, Marc et al., "Athermal Silicon Waveguides with Bridged Subwavelength Gratings for TE and TM Polarizations", Optics Express, vol. 20, Issue 16, Jul. 30, 2012, pp. 18356-18361.

Huang, Huamao et al., "Design of Temperature-Independent Arrayed Waveguide Gratings Based on the Combination of Multiple Types of Waveguide", Applied Optics, vol. 49, No. 16, Jun. 1, 2010, pp. 3025-3034.

* cited by examiner

INTEGRATED PHOTONIC DEVICES WITH REDUCED SENSITIVITY TO EXTERNAL INFLUENCES

CROSS-REFERENCE TO RELATED APPLICATIONS

This application claims the benefit of priority of U.S. Provisional Patent Application Ser. No. 61/734,042, filed Dec. 6, 2012, which is hereby incorporated herein by reference in its entirety.

FIELD OF THE INVENTION

The present invention relates in certain aspects to methods for reducing the sensitivity of on-chip integrated photonic devices having a wavelength-dependent transmission or filter characteristic to influences or effects acting on the chip as a whole or on the local environment of the photonic device. The invention also relates in certain aspects to on-chip integrated photonic devices having a wavelength-dependent transmission or filter characteristic with a reduced sensitivity to the aforementioned effects.

BACKGROUND OF THE INVENTION

The sensitivity of on-chip integrated photonic devices to external effects acting on the chip or on the local environment of the photonic device is a major issue, in particular for integrated photonic devices with an intentional wavelength-dependent transmission or filter characteristic. The dependence of device characteristics on temperature, geometrical variations (e.g. related to manufacturing tolerances) and/or ionizing radiation, is undesirable for such integrated photonic devices.

For example, the problem of temperature sensitivity is in particular pronounced for photonic devices made in a material having a high dependence of refractive index on temperature (i.e. a high thermo-optic coefficient). Therefore, temperature dependence is one of the fundamental limitations of silicon photonic devices, because of the high thermo-optic coefficient of silicon ($1.86 \times 10^{-4}$ $K^{-1}$). It is a challenge to reduce the temperature sensitivity of such photonic devices, in particular photonic devices with a wavelength-dependent transmission or filter characteristic, especially in combination with a low propagation loss and small footprint.

The temperature dependence of integrated silicon photonic devices can be reduced by providing an overlay as a top cladding layer, wherein the overlay material (e.g. a polymer) has a thermo-optic coefficient opposite to the thermo-optic coefficient of silicon. However, the use of such an overlay may lead to aging problems and thermal hysteresis. Moreover, a polymer overlay cannot withstand high-temperature treatments typically used in back-end metallization in CMOS processes. Therefore the use of such a polymer overlay is not CMOS compatible.

Another solution is the use of local heaters to dynamically stabilize the photonic device. However, this requires active temperature monitoring which is space consuming and leads to high power consumption.

In US 2011/0102804 a Mach-Zehnder interferometer (MZI) is described that can be made athermal (temperature independent) by using different waveguide arm widths and selecting proper arm lengths such that the temperature sensitivity of one arm cancels that of the other arm. This is based on the different response of the waveguides to changes in temperature because the fraction of light that is confined in the silicon waveguide core is different for both waveguides.

Similarly, integrated silicon photonic devices are very sensitive to variations in line-width and thickness (e.g. induced by the fabrication process) and to ionizing radiation.

SUMMARY OF THE INVENTION

In one aspect of the invention, certain embodiments of the present invention provide improved photonic methods and photonic devices having a reduced sensitivity to external effects.

According to a first aspect, the present invention provides an integrated photonic device having a wavelength-dependent characteristic, the device comprising: a Splitter Polarization Rotator SPR having an input port for receiving polarized light, and a first output port for providing a first wave, and a second output port for providing a second wave; a first arm having dimensions for (mainly) propagating a first polarization mode of the first wave, an input side of the first arm being optically connected to the first output port of the SPR; a second arm having dimensions for (mainly) propagating a second polarization mode of the second wave, the second polarization mode being different from the first polarization mode, an input side of the second arm being optically connected to the second output port of the SPR; and a Polarization Rotator and Combiner PRC having a first input port optically connected to an output side of the first arm for receiving the propagated first wave, and a second input port optically connected to an output side of the second arm for receiving the propagated second wave, and an output port for providing the combination of the propagated first wave and the propagated second wave as an output wave; wherein the dimensions of the first arm and the dimensions of the second arm are selected to substantially cancel out the influence of an external effect on the wavelength-dependent characteristic.

The first arm may be a first waveguide arm. The second arm may be a second waveguide arm. The dimensions (design parameters) of the first arm and of the second arm can for example include the line-width of the arms, the height of the arms and/or the length of the arms. The line-width can be constant along the length of an arm or it can vary along the length of an arm.

In one aspect of the invention, it is an advantage of certain embodiments of the present invention that the dimensions of the arms are chosen so as to reduce, e.g. minimize, e.g. substantially cancel out the influence of effects such as temperature variations, geometric tolerances or radiation on an optical characteristic of the photonic device, such as e.g. its transmission characteristic or its filter characteristic. Such devices having substantially reduced sensitivity to external effects are further referred to as "compensated devices".

In one aspect of the invention, it is an advantage of certain embodiments of the present invention that fabrication of the photonic devices is compatible with standard processing techniques for integrated photonic devices, e.g. silicon based integrated photonic devices. It is an advantage that there is no need for modifying or adapting fabrication processes.

When compared to the solution proposed in US2011/0102804, the main difference is that in certain embodiments of the present invention light of two different polarities (e.g. TE and TM) is used, as opposed to only a single polarity (TE) in the prior art. The main advantage hereof is that the photonic devices of the present invention can have a small footprint and low losses due to the use of TM polarization. The main disadvantage of using only a single polarity is that either the device size is large or the use of very narrow (and therefore lossy) waveguides is required to have a sufficient difference in thermo-optic response between both waveguide arms.

In one aspect of the invention, it is an advantage of certain embodiments of the present invention that the need for providing an overlay, e.g. a polymer overlay, with a thermo-optic coefficient opposite to the thermo-optic coefficient of the core material, as a top cladding can be avoided. Hence also problems related to such overlays, such as aging and thermal hysteresis, can be avoided.

In one aspect of the invention, it is an advantage of certain embodiments of the present invention that the need for providing local heaters to dynamically stabilize the photonic devices can be avoided. Therefore high power consumption can be avoided.

In certain embodiments of the present invention, the first polarization mode is a Transverse Magnetic mode (TM) and the second polarization mode is a Transverse Electric Mode (TE), or vice versa.

In certain embodiments of the present invention, the dimensions of the first arm and the dimensions of the second arm are selected to substantially cancel the influence of at least one effect selected from the group of dimension tolerances, radiation and temperature variations on an optical characteristic of the photonic device.

In certain embodiments of the present invention, the optical characteristic is selected from a transmitted wavelength or a filtered wavelength.

In certain embodiments of the present invention, the dimensions of the first arm and the dimensions of the second arm are adapted to substantially cancel out the influence of temperature variations on said optical characteristic.

The dimensions of the first and second arm may e.g. be chosen to substantially cancel the influence of temperature variations on a transmitted wavelength characteristic. Alternatively, the dimensions of the first and second arm may e.g. be chosen to substantially cancel the influence of temperature variations on a filtered wavelength characteristic.

The difference in confinement between the first polarization mode in the first arm and the second polarization mode in the second arm induces a different thermo-optic coefficient, thus allowing the influence of temperature on the device characteristics to be cancelled out and thus substantially reducing temperature sensitivity.

In contrast to US2011/0102804, where a single polarity was used, the use of different polarizations amplifies the difference in temperature response in both arms without introducing high propagation losses.

In certain embodiments of the present invention, the dimensions of the first arm and the dimensions of the second arm are selected to substantially cancel out the influence of geometrical variations, such as for example variations in linewidth, on said optical characteristic.

The dimensions of the first and second arm may e.g. be chosen to substantially cancel the influence of line-width on a transmitted wavelength characteristic. Alternatively, the dimensions of the first and second arm may e.g. be chosen to substantially cancel the influence of line-width on a filtered wavelength characteristic.

In certain embodiments of the present invention, the dimensions of the first arm and the dimensions of the second arm are selected to substantially cancel out the influence of radiation effects, e.g. ionization radiation effects.

The dimensions of the first and second arm may e.g. be chosen to substantially cancel the influence of radiation-effects on a transmitted wavelength characteristic. Alternatively, the dimensions of the first and second arm may e.g. be chosen to substantially cancel the influence of radiation-effects on a filtered wavelength characteristic.

In certain embodiments of the present invention, the device is a wavelength filter, preferably selected from the group of a Mach-Zehnder interferometer (MZI), a ring resonator and an arrayed-waveguide grating.

In certain embodiments of the present invention, the integrated photonic device further comprises:—a wavelength selective modulator, optically coupled to the first arm by a coupler (such as a second SP) for coupling light of the first polarization mode from the first arm to light of the second polarization mode in the wavelength selective modulator; and wherein the dimensions of the first arm and dimensions of the second arm are selected to substantially cancel wavelength drift of the wavelength selective modulator due to external effects.

The wavelength selective modulator may be a ring modulator.

According to a second aspect, the invention relates to a method for reducing the sensitivity of an integrated photonic device having a wavelength-dependent characteristic, comprising the steps of:—splitting a light beam in a first wave having a first polarization mode and a second wave having a second polarization mode different from the first polarization mode; —propagating the first wave through a first arm; —propagating the second wave through a second arm; —combining the propagated first wave and the propagated second wave at an output side of the first arm and of the second arm; wherein the dimensions of the first arm and the dimensions of the second arm are selected to substantially cancel out the influence of an external effect on the wavelength-dependent characteristic.

The first arm may be a first waveguide arm, the second arm may be a second waveguide arm. The external effect may be any effect selected from the group consisting of temperature variations, geometric variations and radiation effects.

In certain embodiments of the method of the present invention, the integrated photonic device is a wavelength filter, preferably selected from the group of a Mach-Zehnder interferometer (MZI), a ring resonator and an arrayed-waveguide grating, and the optical characteristic is a transmission or filter characteristic of said wavelength filter.

In certain embodiments of the method of the present invention, the integrated photonic device further comprises a wavelength selective modulator optically coupled to the first arm; wherein the method further comprises the step of:—coupling light of the first polarization mode from the first arm to light of the second polarization mode in the wavelength selective modulator; and wherein the optical characteristic is a resonance wavelength of the wavelength selective modulator.

Certain advantages of various embodiments of the present invention have been described herein above. Of course, it is to be understood that not necessarily all advantages may be achieved in accordance with any particular embodiment of the present invention. Thus, for example, those skilled in the art will recognize that the invention may be embodied or carried out in a manner that achieves or optimizes one advantage or group of advantages as taught herein without necessarily achieving other advantages as may be taught or suggested herein. Further, it is understood that this summary is merely an example and is not intended to limit the scope of the invention. The invention, both as to organization and method of operation, together with features and advantages thereof, may best be understood by reference to the following detailed description when read in conjunction with the accompanying drawings.

BRIEF DESCRIPTION OF THE DRAWINGS

FIG. 2(a) shows a cross section; FIG. 2(b) shows a top view.

Figure 1:
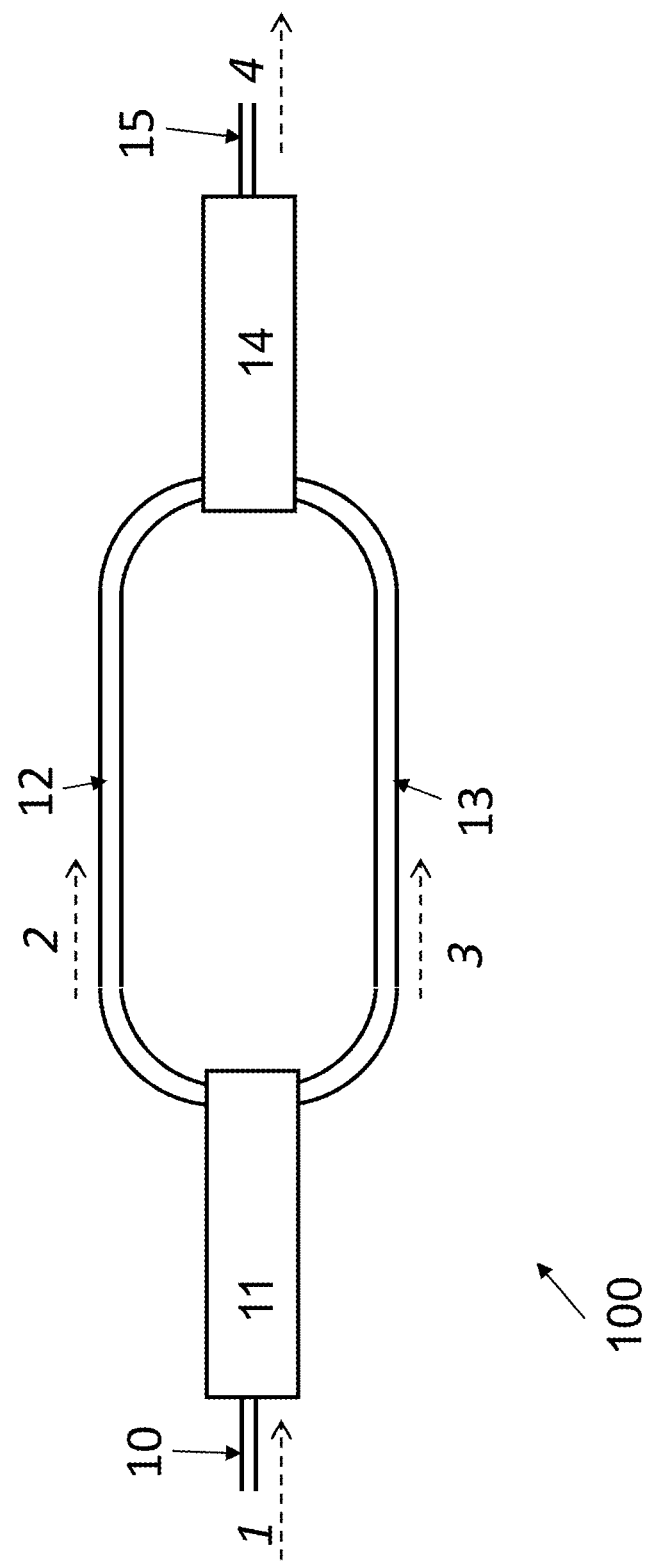
FIG. 1 schematically shows a Mach Zehnder Interferometer in accordance with an embodiment of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second, third and the like in the description, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

In the context of the present invention, a 'wavelength-selective device' is a photonic device having an intentional, e.g. a predefined, wavelength dependent characteristic, such as a wavelength dependent transmission characteristic or a wavelength-dependent filter characteristic. Examples of wavelength-selective devices are filters, resonators and ring modulators, the present invention not being limited thereto.

In the context of the present invention, an 'external effect' can be any effect that acts on the chip as a whole or on the local environment of the photonic device on the chip, such as for example temperature influences, radiation effects or geometrical effects. In the further description, examples are given for certain embodiments wherein the 'external effect' refers to the temperature. However, the present invention is not limited thereto.

This invention relates in certain aspects to wavelength-selective on-chip integrated photonic devices having a substantially reduced sensitivity to external effects (further also referred to as 'compensated' devices). For example, the present invention relates in one aspect to wavelength-selective integrated photonic devices having a substantially reduced temperature sensitivity, wherein the need for providing local heaters is avoided, wherein the photonic devices have low propagation losses and a reduced footprint as compared to existing photonic devices, (e.g. as described in US 2011/0102804) and wherein the photonic device processing is compatible with standard processing techniques, e.g. compatible with CMOS processing, such that there is no need to modify the manufacturing process.

The problem of temperature dependence of photonic device characteristics is particularly pronounced in a silicon based material system. Similarly, silicon photonic waveguide devices are very sensitive to variations in width and height of its structure or elements thereof. It has also been shown that silicon photonic waveguides are sensitive to exposure to ionizing radiation.

One aspect of the invention is further described with respect to integrated photonic devices that are fabricated in a silicon based material system (such as e.g. SOI), i.e. wherein silicon is used as a material for the waveguide core. However, wavelength selective devices in accordance with other aspects of the present invention can be realised in any suitable material system known by a person skilled in the art.

Compensated wavelength-selective devices according to certain embodiments of the present invention contain two or more delay lines (integrated waveguides, waveguide arms) wherein, in operation, two delay lines propagate a different polarization of light. In operation, a first delay line or first integrated waveguide propagates (mainly) TM polarized light while a second delay line or second integrated waveguide propagates (mainly) TE polarized light. The difference in optical confinement in the waveguide core between both polarizations induces a different response of the waveguide mode to temperature variations. Based on this difference, the effect of temperature on the device characteristics can be reduced, or made to substantially cancel out (compensate), if appropriate design parameters are selected. The design parameters can for example include the line-width of the delay lines (wherein the line-width can be constant along the length of a delay line or wherein the line-width can vary along the length of a delay line), the height of the delay lines and/or the length of the delay lines. However, these design parameters cannot be selected independently in order to achieve the reduction or substantial cancellation.

In certain embodiments of the present invention a waveguide for propagation of TE polarization and a waveguide for propagation of TM polarization are used. When the width and height of the waveguides are properly selected, the TM light is much less confined in a waveguide than the fundamental TE mode, and it experiences a weaker temperature response. In addition, the propagation loss for the TM mode is lower than for the TE mode, as the TM mode does not have high field intensities on the rough sidewalls of the waveguide core material.

An example of a compensated Mach Zehnder Interferometer (MZI) in accordance with an embodiment of the present invention is schematically illustrated in FIG. 1. The device 100 comprises an input waveguide 10 optically connected to an input port of a Splitter Polarization Rotator (SPR) 11. At an output side, the SPR 11 is optically connected to an input side of a first waveguide arm 12 (upper waveguide, upper arm in this drawing) and to an input side of a second waveguide arm 13 (lower waveguide, lower arm in this drawing). The width of the first waveguide arm 12 and the width the second waveguide arm 13 can be the same or it can be different. It can be selected to obtain a good balance between low propagation loss and a large difference in thermo-optic response. Along the length of the arms, the width of both waveguides can be varied. However, in the example further described it is assumed that the width of the waveguides is substantially the same over the entire length of the waveguide arms. For instance for silicon based waveguides, the width can for example be in the range between about 250 nm and about 1000 nm, e.g. in the order of about 450 nm. The MZI device can for example be fabricated in an SOI material system, wherein silicon is used as a core material for the waveguides and wherein a silicon oxide lower cladding layer is used. The upper cladding layer can for example be air or a dielectric layer such as an oxide layer or a nitride layer.

The first waveguide arm 12 and the second waveguide arm 13 are at their output side optically connected to a first resp. second input port of a Polarization Rotator and Combiner (PRC) 14, an output side of the PRC 14 being optically connected to an output waveguide 15. The PRC 14 can be a device similar to the SPR 11, but reversed in operation.

In operation, polarized light 1 of a first polarisation state is provided as an input to the SPR 11, for example from an on-chip input waveguide 10 as illustrated in FIG. 1. The polarized light 1 of the first polarisation state passes through the Splitter and Polarization Rotator (SPR) 11 that splits it and converts it into a first wave 2 of a second polarisation state, and a second wave 3 of the first polarisation state. As an example, transverse electric (TE) polarized light 1 may be provided as an input to the SPR 11, for example from an on-chip input waveguide 10 as illustrated in FIG. 1. The TE polarized light 1 passes through the Splitter and Polarization Rotator (SPR) 11 that splits it and converts it into a first portion, e.g. 50%, transverse magnetic (TM) wave 2 and a second portion, e.g. 50%, transverse electric (TE) wave 3. However, the present invention is not limited to the polarized light 1 being TE polarized. It can also be TM polarized light, that is split into a TM wave and a TE wave by the SPR 11. Also, the present invention is not limited to 50%/50% splitting. The SPR 11 (and the PRC 14) can be modified to have a different ratio of optical power between the two arms 12, 13, which can for example be used to adjust the balance of the arms to desired specifications, e.g. when one arm exhibits a higher overall propagation loss than the other. The polarised light 2 of the second polarisation state, e.g. TM polarized light 2, is directed to and propagates through the first waveguide arm 12 and the polarised light 3 of the first polarisation state, e.g. TE polarized light 3, is directed to and propagates through the second waveguide arm 13. At an output side of the upper waveguide arm 12 and the lower waveguide arm 13, both light waves 2, 3 are coupled to the Polarization Rotator and Combiner (PRC) 14, resulting in a polarised output wave 4 of the first polarisation state, e.g. a TE polarized output wave 4, e.g. propagating in an output waveguide 15 connected to an output port of the Polarization Rotator and Combiner (PRC) 14. The output wave 4 results from interference of waves 2 and 3 in both arms, which exhibit a wavelength-dependent response.

Figure 2:
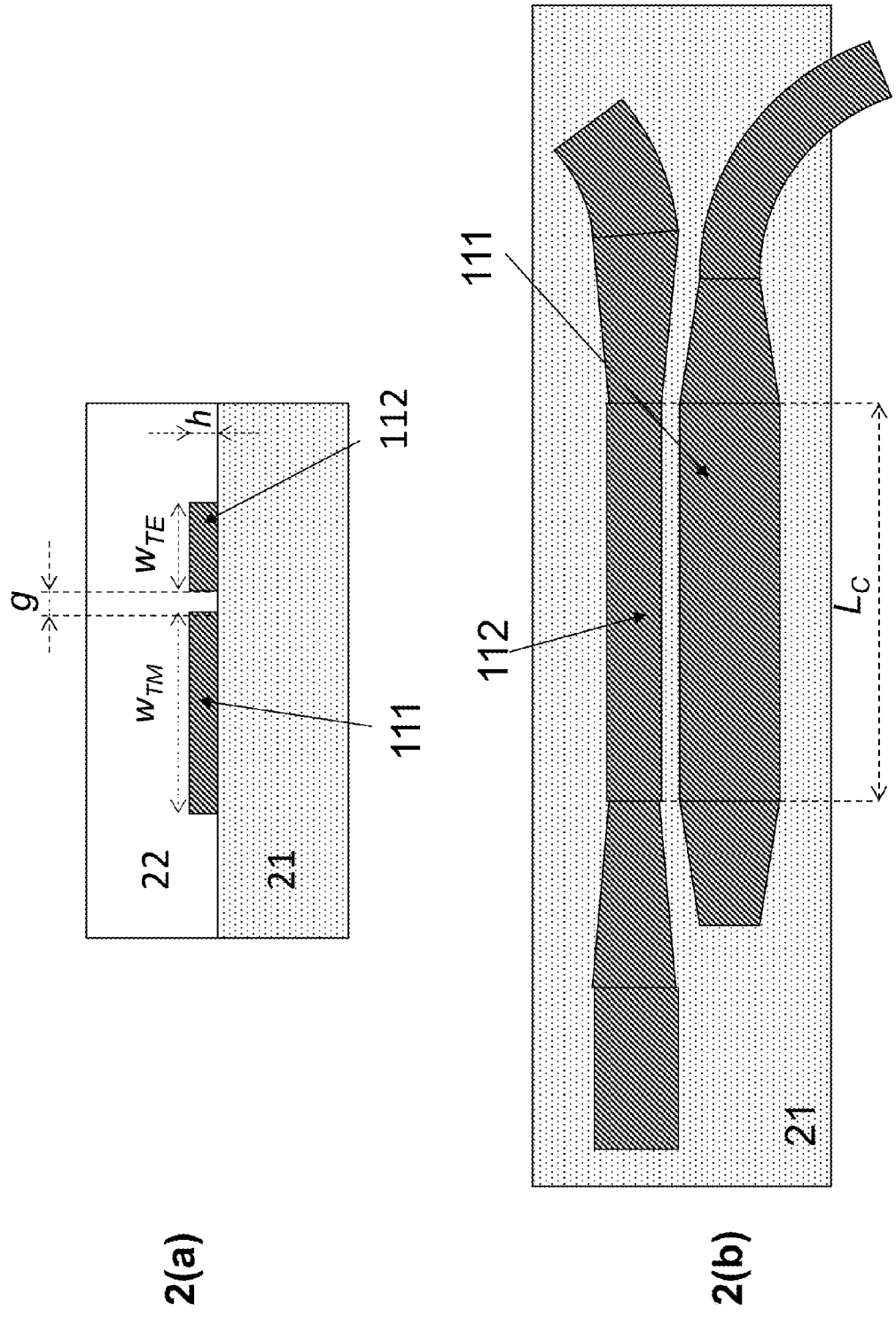
FIG. 2 schematically shows a Splitter and Polarization Rotator (SPR) with air as an upper cladding layer, as can be used in certain embodiments of the present invention.

FIG. 2 schematically shows an example of a Splitter and Polarization Rotator (SPR) 11 that can be used in certain embodiments of photonic devices according to the present invention. In the example shown, the lower cladding layer 21 is for example a silicon oxide layer and the upper cladding layer 22 is air. FIG. 2(a) shows a cross section of the SPR and FIG. 2(b) shows a top view of the SPR. The SPR comprises a first SPR waveguide 111 and a second SPR waveguide 112, the first SPR waveguide 111 and the second SPR waveguide 112 being provided on the lower cladding layer 21 with a small, constant gap g in between the first SPR waveguide 111 and the second SPR waveguide 112 over a predetermined distance or coupling length Lc. The gap g is sufficiently small to allow transfer of optical power between the second SPR waveguide 112 and the first SPR waveguide 111. For example, the gap size can be in the range between about 50 nm and about 500 nm. The width $W_{TE}$ of the second SPR waveguide 112 is different from (in this example: smaller than) the width $W_{TM}$ of the first SPR waveguide 111, to allow mode matching. An incoming light wave, such as for example a TE wave (e.g. light wave 1 in FIG. 1), propagating through second SPR waveguide 112 can couple into first SPR waveguide 111. In certain embodiments of the present invention the coupling length Lc is selected to allow about 50% power transfer from the second SPR waveguide 112 (TE mode) to the first SPR waveguide 111 (TM mode). At the entrance and exit of the SPR, a geometric variation (e.g. a tapering section) can be provided to avoid undesired reflections.

In a MZI 100 according to certain embodiments of the present invention, as illustrated in FIG. 1, the output end of the second SPR waveguide 112 (second output port of the SPR 11) is optically connected to second waveguide arm 13 and the output end of the first SPR waveguide 111 (first output port of the SPR 11) is optically connected to first waveguide arm 12. Adiabatic tapers or non-adiabatic mode-matching structures can be provided to connect narrower and wider sections of waveguides.

A Polarization Rotator and Combiner (PRC) 14 as can be used in certain embodiments of the present invention can have a device structure similar to a Splitter and Polarization Rotator device structure, an example being shown in FIG. 2, but operated in the reverse direction. The PRC 14 comprises a first PRC waveguide and a second PRC waveguide, the first PRC waveguide and the second PRC waveguide being provided on the lower cladding layer 21 with a small, constant gap g' in between the first PRC waveguide and the second PRC waveguide over a predetermined distance or coupling length Lc'. The gap g' is sufficiently small to allow transfer of optical power between the first PRC waveguide and the second PRC waveguide. For example, the gap size g' can be in the range between about 50 nm and about 500 nm. The width of the second PRC waveguide is different from the width of the first PRC waveguide, to allow mode matching. In operation, a first incoming light wave (e.g. light wave 2 in FIG. 1) is TM polarized and propagates through the first PRC waveguide; a second incoming light wave (e.g. light wave 3 in FIG. 1) is TE polarized and propagates through the second PRC waveguide. In certain embodiments of the present invention the coupling length Lc' between both PRC waveguides is selected to allow full power transfer from the first PRC waveguide (TM mode) to the second PRC waveguide (TE mode). In a MZI according to certain embodiments of the present invention, as illustrated in FIG. 1, the output end of the PRC 14 is optically connected to output waveguide 15. Adiabatic tapers or non-adiabatic mode-matching structures can be provided to connect narrower and wider sections of waveguides.

Figure 3:
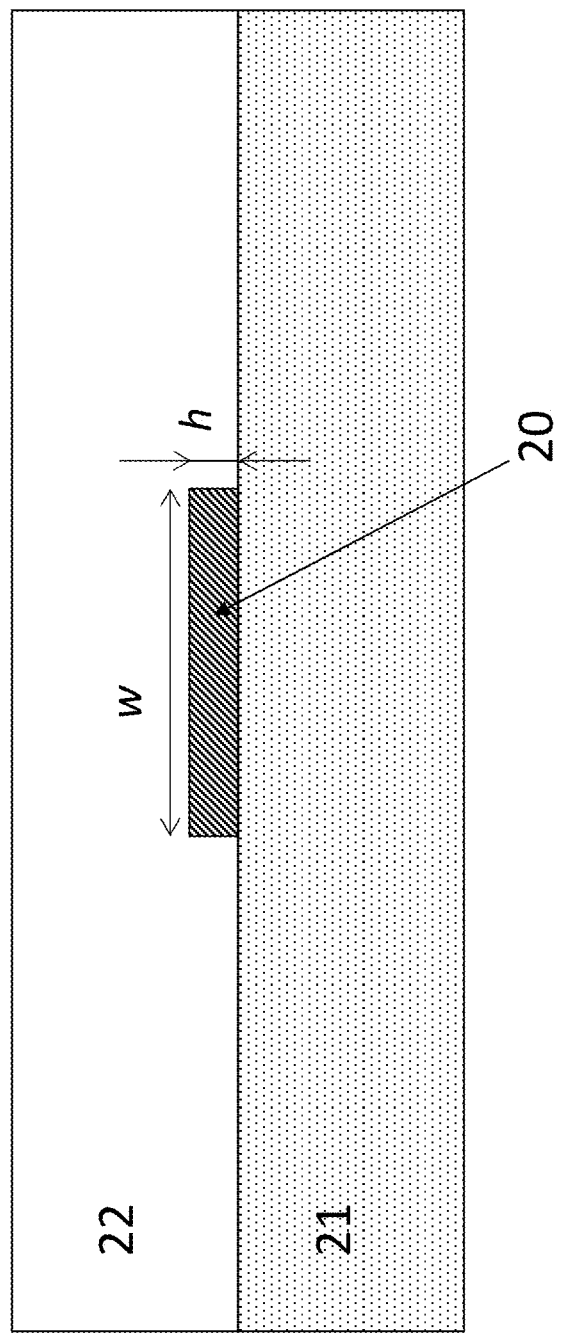
FIG. 3 is a schematic cross section of a silicon waveguide as used in simulations.
Figure 4:
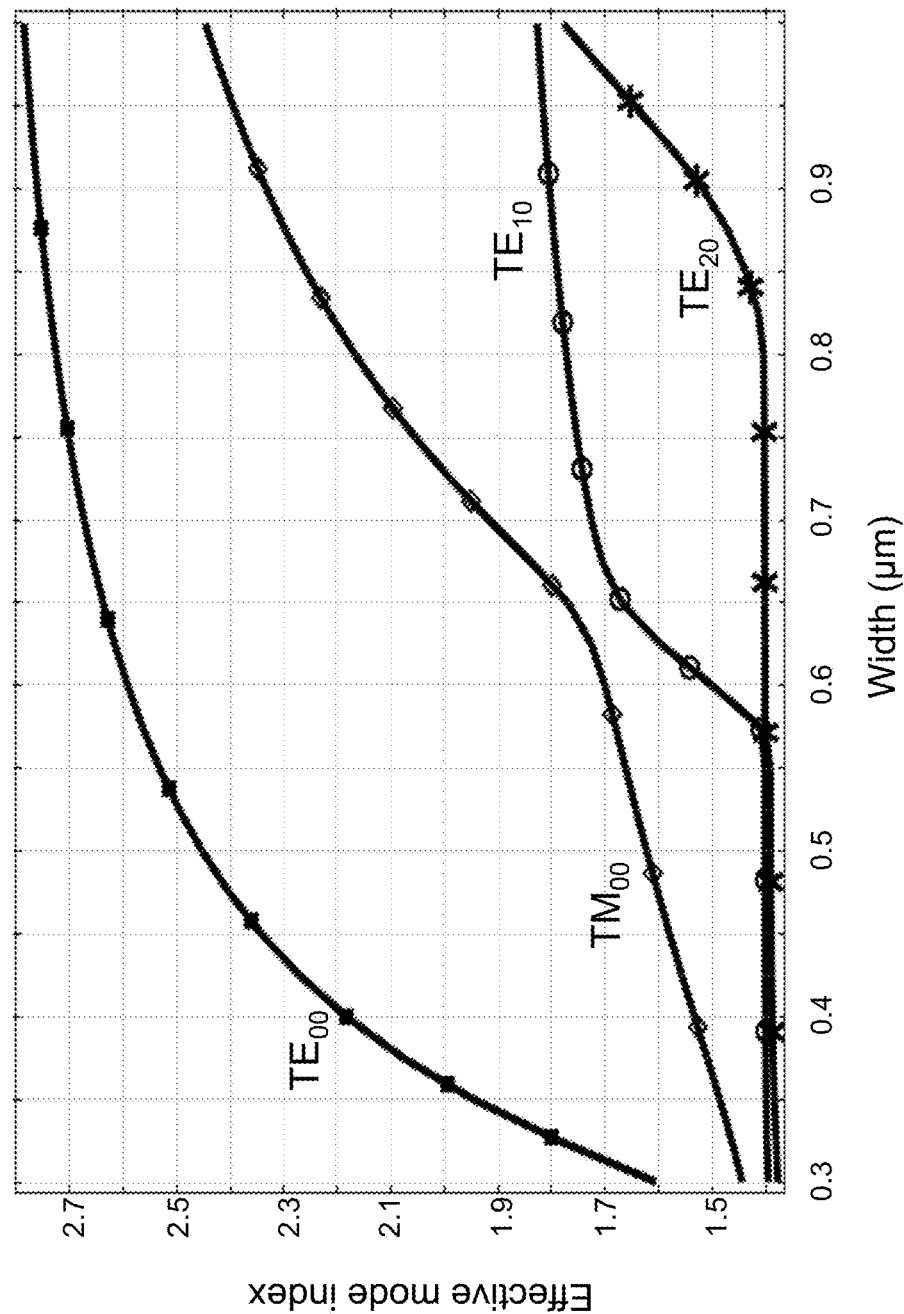
FIG. 4 illustrates the effect of width variation of the silicon waveguide of FIG. 3 on the effective refractive index of the waveguide, for TE and TM polarized light.

A temperature insensitive MZI according to certain embodiments of the present invention as shown in FIG. 1 was simulated. FIG. 3 shows a schematic cross section of a silicon waveguide with air upper cladding that was used in the simulations. The silicon core 20 of the waveguide has a height h and a width w. In the example shown, the lower cladding layer 21 is silica and the upper cladding layer 22 is air. In the simulations the height h of the Si waveguide was maintained at 220 nm and the width w was varied. The lower cladding layer 21 and the upper cladding layer 22 are assumed to have a thickness of 2 micrometer. The dispersion behaviour of the waveguide (effect of width variation of the silicon waveguide on the effective refractive index) is shown in FIG. 4 for TE polarized and for TM polarized light (wherein TE00 represents the fundamental TE mode, TM00 represents the fundamental TM mode, TE10 and TE20 represent other modes of the polarized light).

For a MZI wherein the waveguides in both arms 12, 13 are the same and operate with the same polarization, the condition for constructive interference is:

$$m\lambda = n_{eff} \Delta L \quad (1)$$

with m an integer, $\lambda$ the wavelength of the light, $n_{eff}$ the effective refractive index of the waveguide mode and $\Delta L$ the path length difference between the first waveguide arm 12 and the second waveguide arm 13. For destructive interference, m should be an integer and a half (0.5; 1.5; 2.5; 3.5; . . . ).

In a method and device according to certain embodiments of the present invention, different waveguides and different modes are used in each of the arms of a MZI. In operation, the first waveguide arm 12 of the MZI propagates TM polarized light while the second waveguide arm 13 of the MZI propagates TE polarized light. Therefore equation (1) is modified to:

$$m\lambda = n_{eff,TM} \cdot L_1 - n_{eff,TE} \cdot L_2 \quad (2)$$

wherein $n_{eff,TM}$ is the effective refractive index of the first waveguide arm carrying the TM mode, $n_{eff,TE}$ is the effective refractive index of the second waveguide arm carrying the TE mode, L1 is the length of the first waveguide arm 12 and L2 is the length of the second waveguide arm 13.

$$M = m - \left( \frac{dn_{eff,TM}}{d\lambda} \cdot L_1 - \frac{dn_{eff,TE}}{d\lambda} \cdot L_2 \right) \quad (3)$$

M is the modified interference order due to the induced dispersion (influence of wavelength on effective refractive index) related to the difference in effective refractive indices in the different arms. The constructive/destructive interference wavelength then shifts with temperature T as:

$$\frac{d\lambda}{dT} = \left( \frac{dn_{eff,TM}}{dT} \cdot L_1 - \frac{dn_{eff,TE}}{dT} \cdot L_2 \right) / M \quad (4)$$

A temperature insensitive (athermal) device is obtained by solving equation (4) for $d\lambda/dT=0$. This allows calculating the corresponding lengths L1 and L2. The larger the difference between $d_{neff,TM}/dT$ of the first arm 12 and $d_{neff,TE}/dT$ of the second arm 13, the smaller will be the footprint (size) of the device. In all the simulations described here, the refractive index n of silicon is assumed to be 3.48 and a silicon thermo-optic coefficient of $1.86 \times 10^{-4}$ K$^{-1}$ is used. For the underlying $SiO_2$ layer a refractive index of 1.45 is used and a thermo-optic coefficient of $1 \times 10^{-5}$ K$^{-1}$.

The waveguide width used for both the first waveguide arm 12 and the second waveguide arm 13 of the exemplary interferometer was 450 nm. Adiabatic tapers provided between the SPR 11 and the waveguide arms 12, 13 and between the waveguide arms 12, 13 and the PRC 14 are included in the device simulations. As can be seen in FIG. 4, for a waveguide width of 450 nm the $n_{eff}$ is about 2.28 for TE polarized light and about 1.55 for TM polarized light. It can be seen that the data in FIG. 4 slightly deviate from these values, but these values were used in the simulations. Their calculated thermo-optic coefficients are $2.19 \times 10^{-4}$ K$^{-1}$ and $9.61 \times 10^{-5}$ K$^{-1}$, respectively.

FIG. 2 schematically illustrates the structure of the SPR 11 in which an input TE signal is split into a TE signal and a TM signal in the wider section due to the phase matching condition and asymmetric structure. The phase matching condition for this structure is fulfilled with a 320 nm wide second SPR waveguide 112 and a 600 nm wide first SPR waveguide 111 at which $n_{eff\_TE} = n_{eff\_TM} = 1.65$ as shown in FIG. 4. In the simulations, the gap g between the two SPR waveguides 12, 13 was kept constant as 200 nm over a distance or coupling length Lc.

Figure 5:
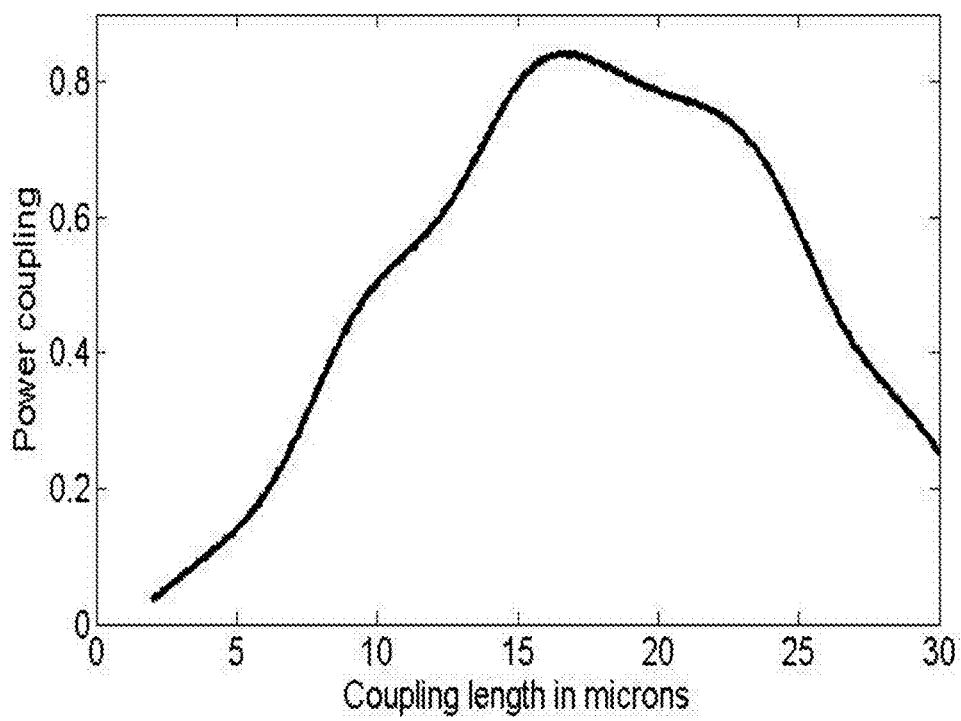
FIG. 5 illustrates power transfer from the TE mode to the TM mode as a function of coupling length for a SPR as shown in FIG. 2.

FIG. 5 shows the power transfer as a function of coupling length ($L_c$) for such SPR 11. It can be seen that for this example, a 50% power transfer from TE to TM takes place at $L_c$=about 10.1 micrometer.

Figure 6:
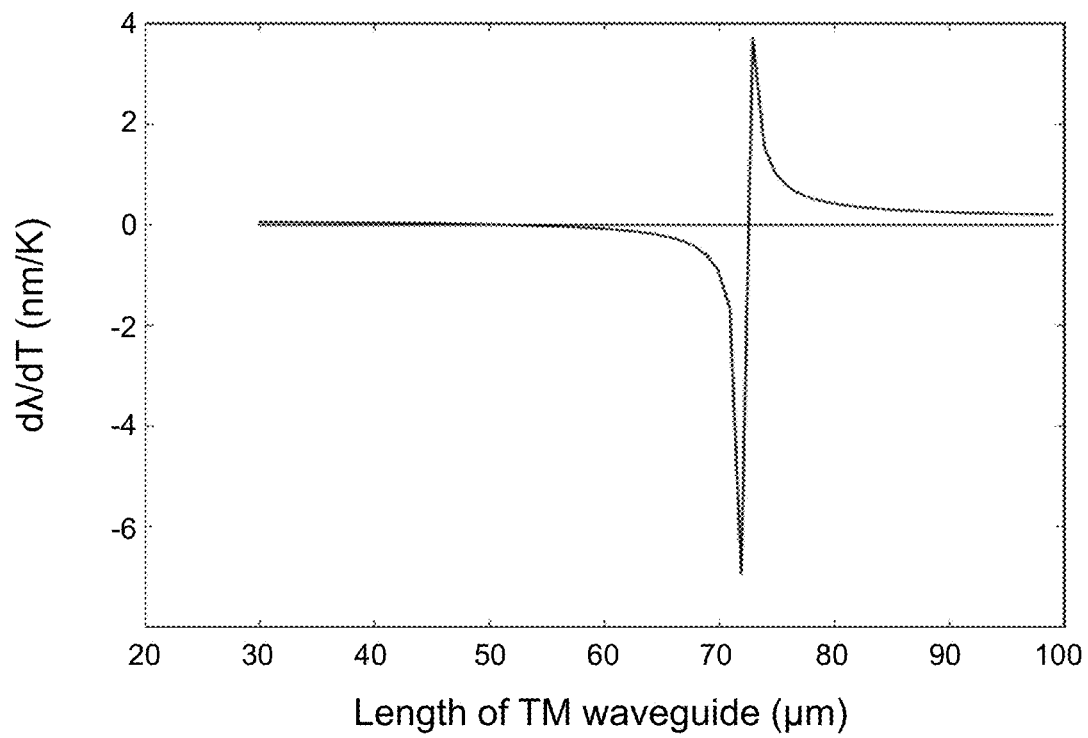
FIG. 6 shows calculated dλ/dT for a MZI according to an embodiment of the present invention as a function of the length of the first waveguide arm, for a fixed length (20 micrometer) of the second waveguide arm.
Figure 7:
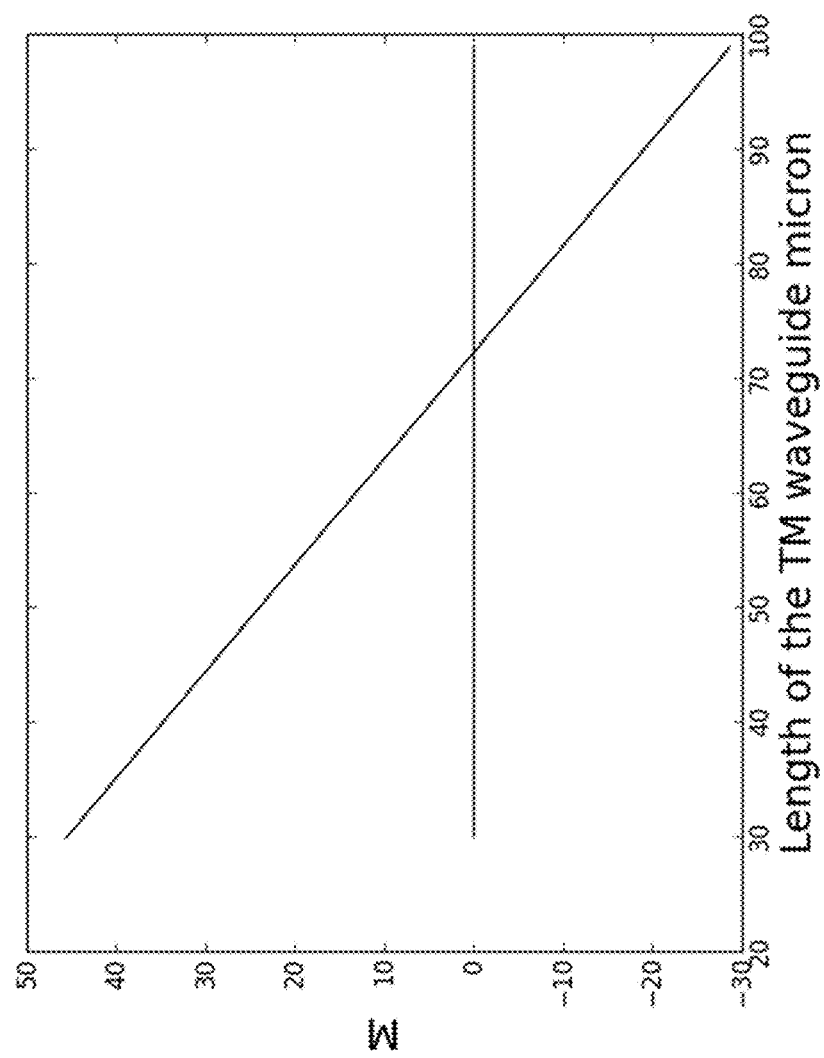
FIG. 7 shows the calculated modified interference M as a function of the length of the first waveguide arm for a fixed length of the second waveguide arm of 20 micrometer, for a MZI in accordance with an embodiment of the present invention.

FIG. 6 shows the calculated $d\lambda/dT$ (using equation (4)) for m=50 as a function of the length L1 of the TM section (first waveguide arm 12) of the interferometer for a given length L2 of 20 micrometer of the TE section (second waveguide arm 13). The corresponding modified interference plot M is shown in FIG. 7. The asymptotic behaviour of $d\lambda/dT$ with length L1 (FIG. 6) can be attributed to the zero crossing of M as shown in FIG. 7. The path length difference L1−L2 for temperature insensitive operation is around 25.6 micrometer for this example (the calculated L1 is 45.6 micrometer for the given length L2 of 20 micrometer).

Figure 8:
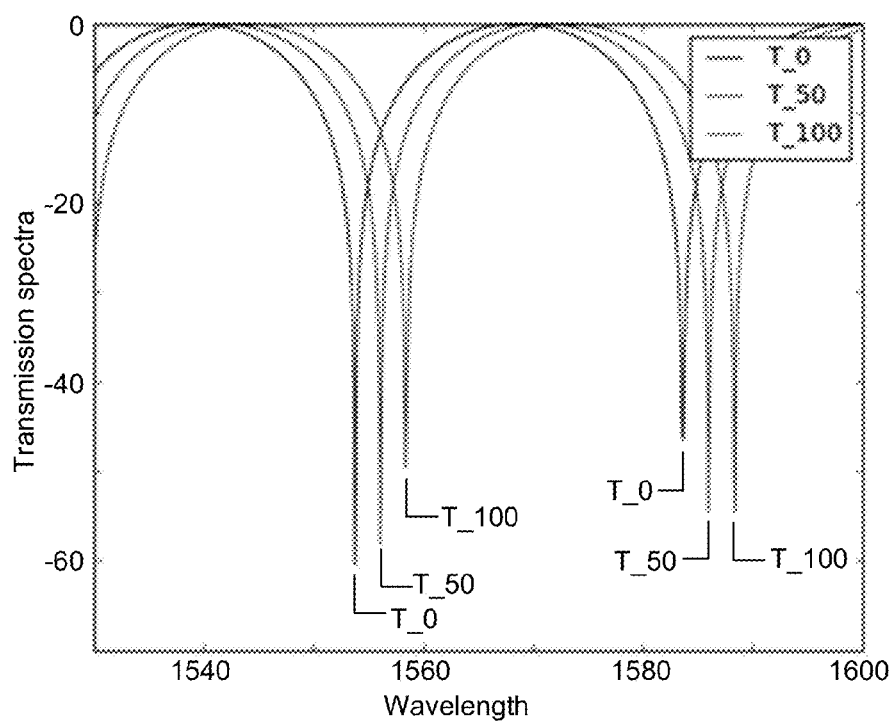
FIG. 8 shows calculated transmission spectra for an uncompensated MZI at 0° C., 50° C. and 100° C.

FIG. 8 shows calculated transmission spectra for a conventional uncompensated MZI with a TM signal in both waveguide arms, for three different temperatures (0° C., 50° C. and 100° C.).

Figure 9:
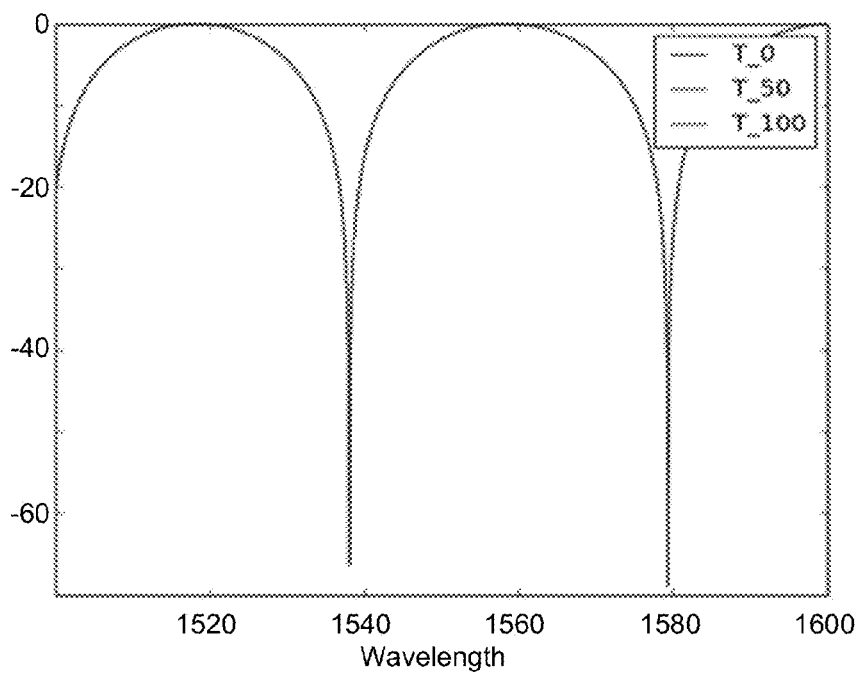
FIG. 9 shows calculated transmission spectra for a compensated (temperature insensitive) MZI according to an embodiment of the present invention, at 0° C., 50° C. and 100° C.

FIG. 9 shows calculated transmission spectra for a compensated (temperature insensitive) design with a TM signal in one waveguide arm, and a TE signal in the other waveguide arm, according to certain embodiments of the present invention, for three different temperatures (0° C., 50° C. and 100° C.). The width of the first (upper) waveguide arm 12 and of the second (lower) waveguide arm 13 of the MZI 100 was 450 nm for all cases and an upper air cladding was assumed. The simulated results show an improvement from 80 pm/K drift for an uncompensated MZI (FIG. 8) to less than 0.2 pm/K for a compensated MZI in accordance with the present invention (FIG. 9).

Figure 10:
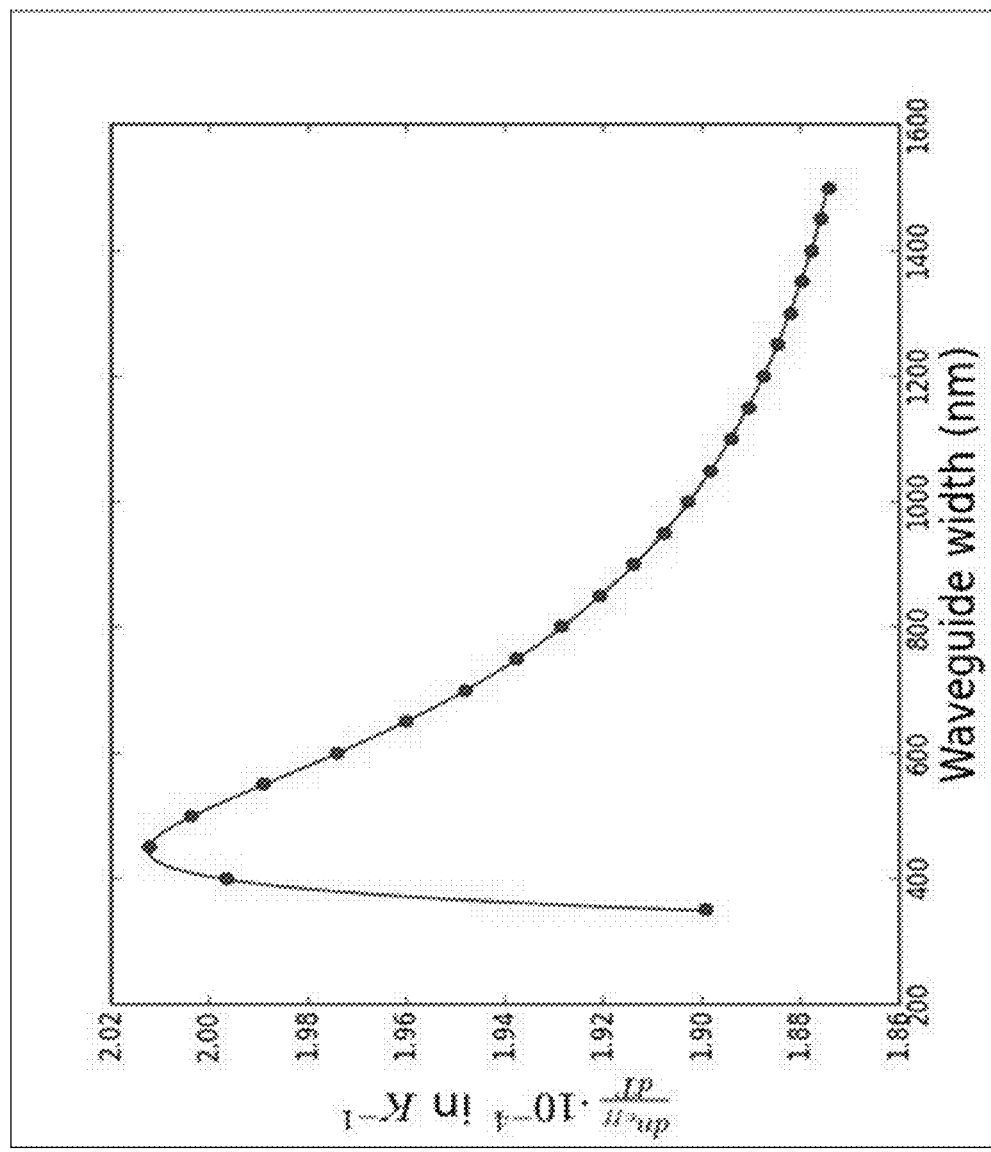
FIG. 10 illustrates thermo-optic coefficient variations as a function of waveguide width for the fundamental TE mode.
Figure 11:
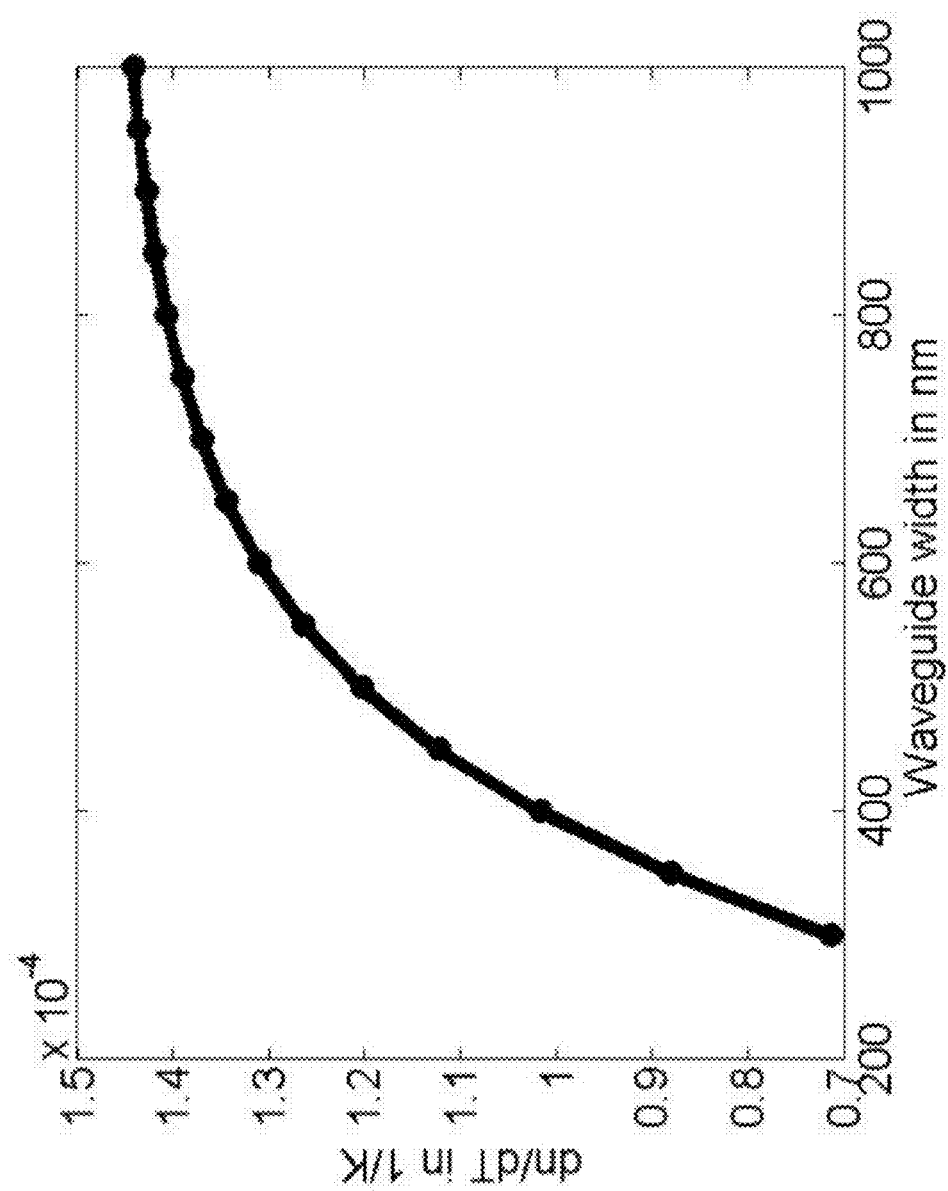
FIG. 11 illustrates thermo-optic coefficient variations as a function of waveguide width for the fundamental TM mode.

FIG. 10 shows the thermo-optic coefficient variation ($dn_{eff}/dT$) as a function of waveguide width for the fundamental TE mode, and FIG. 11 shows the thermo-optic coefficient variation ($dn_{eff}/dT$) as a function of waveguide width for the fundamental TM mode. An about one order difference between both can be seen from FIG. 10 and FIG. 11.

Figure 12:
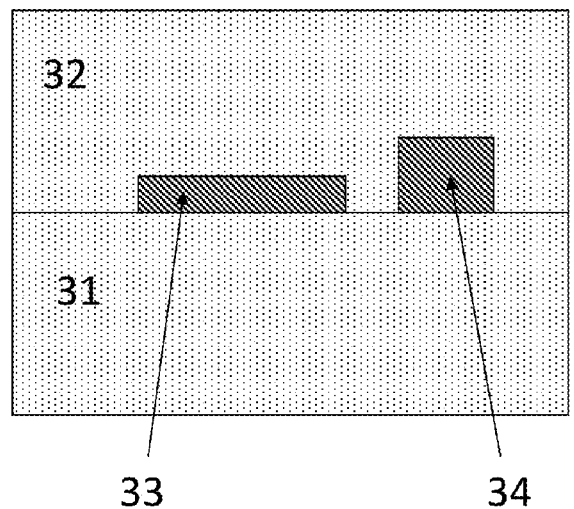
FIG. 12 schematically shows a cross section of an SPR as can be used in certain embodiments of the present invention, with an oxide upper cladding and an oxide lower cladding wherein the second SPR waveguide is thinner and broader than the first SPR waveguide.

In certain embodiments of the present invention, the SPR 11 (as well as the PRC 14) requires a vertical symmetry breaking to enable mode splitting and polarization conversion. With an air upper cladding 22 and a silica lower cladding 21 (as illustrated in FIG. 2) this vertical symmetry breaking is automatically accomplished. In other embodiments, e.g. with a silicon oxide lower cladding and a silicon oxide upper cladding (i.e. wherein the waveguides are fully embedded in silicon oxide) vertical symmetry breaking can be obtained by partially etching one of the two waveguides. FIG. 12 schematically illustrates an SPR design (cross section) for embodiments wherein both the lower cladding layer 31 and the upper cladding layer 32 are made of the same material, e.g. silicon oxide. To overcome the symmetrical structure problem the SPR waveguides 33, 34 have a different height and width.

For example, for an SPR as illustrated in FIG. 12 having a second (TE) SPR waveguide 33 that is 70 nm high and 700 nm wide and a first (TM) SPR waveguide 34 that is 220 nm high and 400 nm wide (assuming a constant width of the SPR waveguides along the coupling length) and with a gap of 180 nm between both waveguides, at a wavelength of 1550 nm 50% power coupling from the TE mode to the TM mode is obtained for a coupling length Lc of about 160 micrometer. This coupler design operates however in a narrow wavelength band, e.g. having a bandwidth of less than 3 nm.

Wide band operation of an SPR as shown in FIG. 12 can be obtained by varying the width of an SPR waveguide along its length, thus inducing a variation in effective refractive index along the length. This can for example be done by tapering the waveguide from one side and keeping the gap g between the first SPR waveguide 34 and the second SPR waveguide 33 constant.

Figure 13:
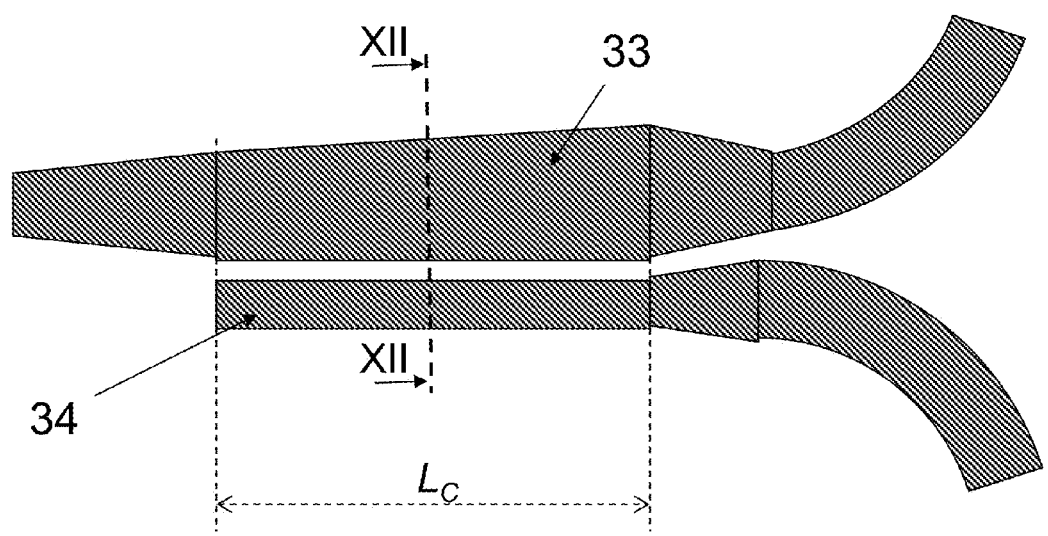
FIG. 13 is a top view of an SPR coupler as shown in FIG. 12, wherein the second SPR waveguide is tapered at one lateral side along the coupling length.

FIG. 13 shows an example (top view) of the waveguides of an SPR having a cross section as in FIG. 12 wherein the wider waveguide 33 (propagating the TE mode in this example) is tapered at one lateral side. The gap g between the first SPR waveguide 34 and the second SPR waveguide 33 is substantially constant along the coupling length $L_c$. For example, the second SPR waveguide 33 can taper from 680 nm width at one end to 720 nm width at an opposite end. This is advantageous since the thin waveguide section 33 is much more sensitive to width variations, which is undesirable.

Figure 14:
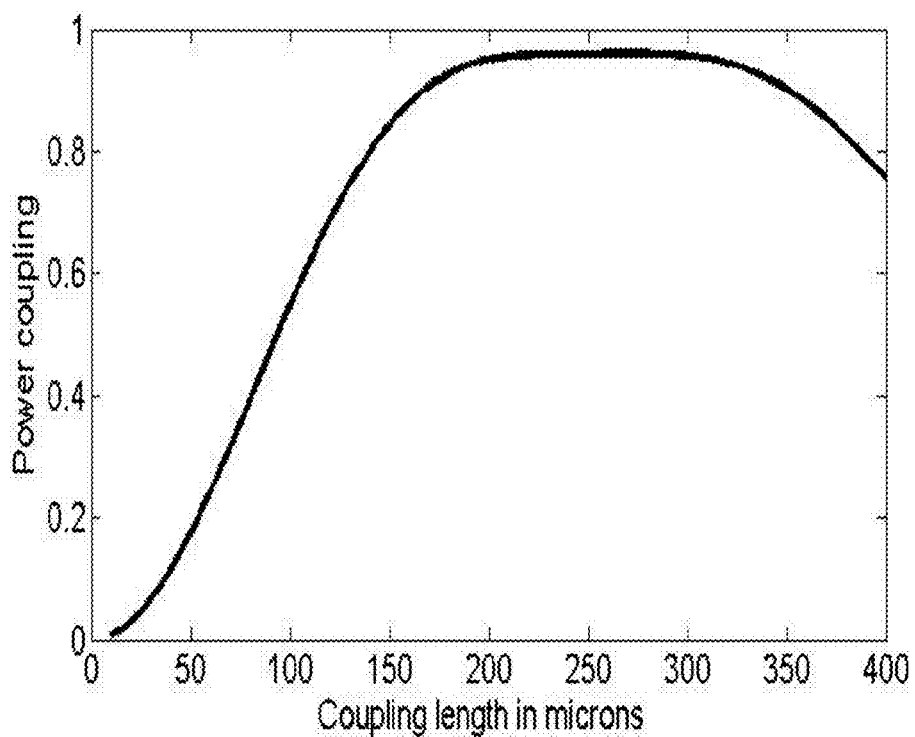
FIG. 14 illustrates power coupling from the TE mode to the TM mode as a function of coupling length for an SPR design as shown in FIG. 12 and FIG. 13.

FIG. 14 illustrates power coupling at a wavelength of 1550 nm from the TE mode to the TM mode as a function of coupling length for the coupler design shown FIG. 13.

Figure 15:
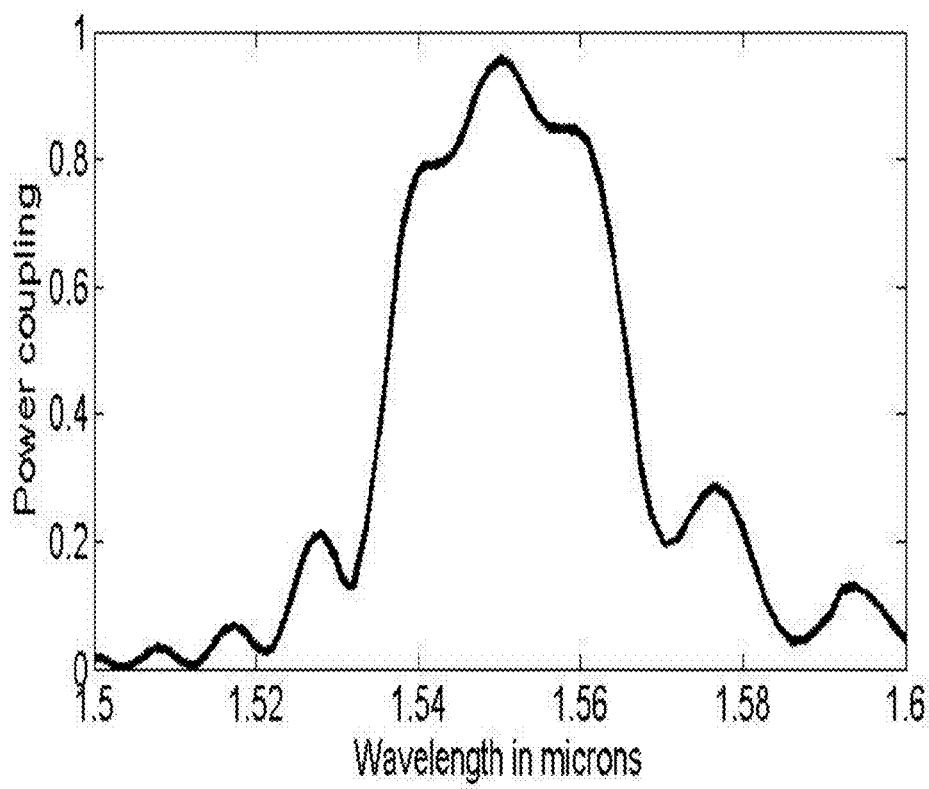
FIG. 15 illustrates power coupling from the TE mode to the TM mode as a function of wavelength for an SPR design as shown in FIG. 12 and FIG. 13.

FIG. 15 illustrates power coupling from the TE mode to the TM mode as a function of wavelength for the coupler design of FIG. 13, showing substantially maximum power transfer from 1540 nm to 1560 nm, which is a substantially broader range than for a design with a constant width for both SPR waveguides.

Figure 16:
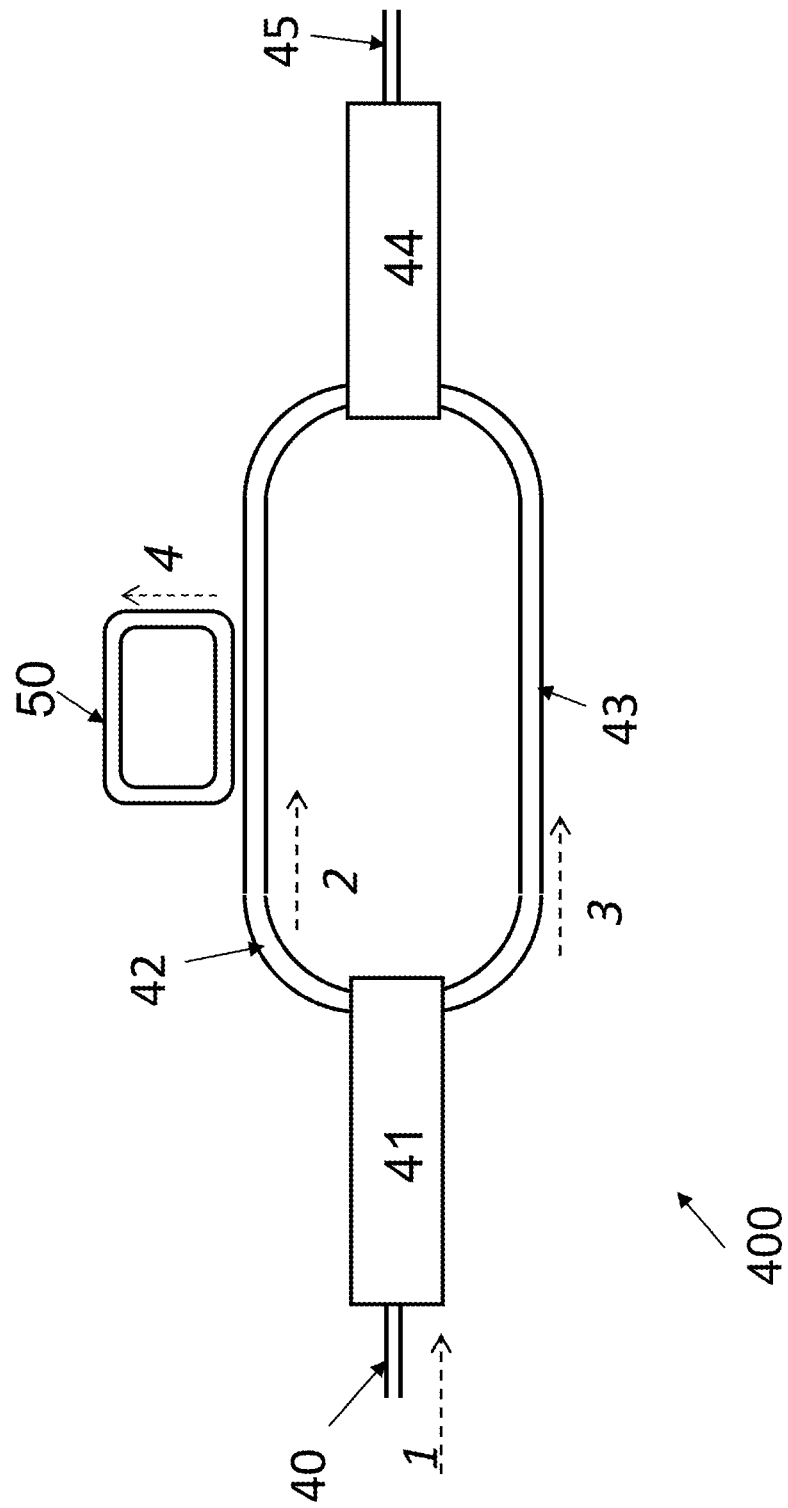
FIG. 16 schematically illustrates a compensated ring modulator in accordance with certain embodiments of the present invention.

Certain aspects of the present invention also relate to a so-called "system", which is in fact also an integrated photonic device 400, but which acts like a "compensated ring modulator". This "compensated ring modulator" in accordance with certain embodiments of the present invention contains an MZI, and a ring structure 50 optically connected to the first waveguide arm 42 of the MZI, the first waveguide arm being adapted for carrying the TM polarization mode. In operation, the system 400 functions as a ring modulator operating in the TE polarization mode. The system 400 further comprises a coupler, e.g. a second SPR, (not shown) to couple light from the TM mode propagating in the first waveguide arm 42 to the TE mode in the ring 50. In this implementation the ring structure 50 preferably has a racetrack shape. In this approach an MZI (comprising the elements 40, 41, 42, 43, 44) is used to passively compensate for temperature-induced wavelength drift of the ring 50. An exemplary embodiment is illustrated in FIG. 16. Input light 1 e.g. coming from a grating coupler is split into 50% TE mode and 50% TM mode by the SPR 41. As mentioned above, the ratio does not need to be exactly 50/50. The TE beam 3 (mainly) propagates through the second waveguide arm 43 of the MZI and the TM beam 2 (mainly) propagates through the first waveguide arm 42 of the MZI. In this example, the first waveguide arm 42 is optically coupled with a racetrack p-n junction depletion based ring 50. In this implementation, the coupler section of the ring 50 is defined by a shallow etch, with silicon remaining around the core of the waveguide. The section is preferably made sufficiently long to over-couple with the ring (i.e. more light is coupled to the ring 50 than needed for critical coupling). Here the cross coupling coefficient kappa=0.4. This structure ensures again a TM to TE conversion, hence light 4 coupled into the ring 50 is TE mode light. At the operating wavelength, the ring 50 can be modulated in and out of resonance by electrically driving the embedded p-n junction. This modulation is a local effect in the ring 50, and it is not compensated by the temperature insensitive MZI (as described further). Thus, the signal modulated on the ring 50 is translated into an amplitude and phase response of the light 2 in arm 42.

The system 400 works in such a way that there is no optical path addition from the MZI in the structure but the thermal effect of the MZI is equal and opposite to that of the ring 50 as given in the following equations:

$$n_1 \cdot L_1 - n_2 \cdot L_2 = 0 \text{ for the } MZI$$

$$\frac{d}{dT}(n_1 \cdot L_1 - n_2 \cdot L_2) = -2 * pi * R \frac{dn_{eff}}{dT} \qquad (5)$$

Here $L_1$ is the length of the first (e.g. upper) arm 42 of the MZI and $n_1$ is its effective index, $L_2$ is the length of the second (e.g. lower) arm 43 of the MZI with effective index $n_2$, R is the radius of the ring 50 and $n_{eff}$ is the effective refractive index of the ring 50. The calculated length of the first and second MZI arms 42, 43 in the example described here are $L_1$=1293 micrometer and $L_2$=902.5 micrometer respectively, and the calculated effective optical length of the race track ring 50 (which includes the straight sections and tapers of the ring 50 as well) is 374.2 micrometer.

This approach allows realizing resonator rings 50 and ring modulators 400 with a resonance dip at a predetermined wavelength that is substantially independent of temperature variations. Thermal compensation of the ring 50 is obtained by the balanced MZI.

Also other integrated photonic devices, such as for example arrayed waveguide gratings can be made temperature insensitive by providing additional delay lines locally. For each TE arm (TE delay line) a TM arm (TM delay line) is provided, both being connected via an SPR and a PRC, the arms having dimensions (such as e.g. length, width, height) chosen to compensate thermal effects of the TE arm by making the local MZI balanced.

Apart from compensating for temperature variations, the method of the present invention can be used to minimize sensitivity to fabrication errors, e.g. fabrication tolerances like width and height variations. The method can also be used to minimize sensitivity to other effects such as ionizing radiation. For this, the dependence of the effective index of the TE and TM modes on the envisaged effect (e.g. line width or radiation) needs to be inserted in the equations (e.g. equation (4)) and method disclosed.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

The invention claimed is:

1. An integrated photonic device having a wavelength-dependent characteristic for use with an input wave having a first polarization, the device comprising:
   a Splitter Polarization Rotator (SPR) having an input port configured to receive the input wave, a first output port configured to provide a first wave having the first polarization and a second output port configured to provide a second wave having a second polarization different from the first polarization;
   a first waveguide arm having dimensions configured to propagate a first polarization mode of the first wave, an input side of the first waveguide arm being optically connected to the first output port of the SPR;
   a second waveguide arm having dimensions configured to propagate a second polarization mode of the second wave, the second polarization mode being different from the first polarization mode, an input side of the second arm being optically connected to the second output port of the SPR; and
   a Polarization Rotator and Combiner (PRC) having a first input port optically connected to an output side of the first waveguide arm and configured to receive the propagated first wave, and a second input port optically connected to an output side of the second waveguide arm and configured to receive the propagated second wave, and an output port for providing the combination of the propagated first wave and the propagated second wave as an output wave having an output polarization;
   wherein the dimensions of the first waveguide arm and the dimensions of the second waveguide arm are selected to substantially cancel out the influence of an external effect on the wavelength-dependent characteristic.

2. The integrated photonic device according to claim 1, wherein the first polarization is a Transverse Magnetic (TM) polarization and the second polarization is a Transverse Electric (TE) polarization.

3. The integrated photonic device according to claim 1, wherein the first polarization is a Transverse Electric (TE) polarization and the second polarization is a Transverse Magnetic (TM) polarization.

4. The integrated photonic device according to claim 1, wherein the dimensions of the first waveguide arm and the dimensions of the second waveguide arm are selected to substantially cancel the influence of at least one effect selected from the group of dimension tolerances, radiation and temperature variations on an optical characteristic of the photonic device.

5. The device according to claim 4, where the optical characteristic is selected from a transmitted wavelength and a filtered wavelength.

6. The integrated photonic device according to claim 1, wherein the device is a wavelength filter.

7. The integrated photonic device according to claim 1, wherein the device is selected from the group of a Mach-Zehnder interferometer (MZI), a ring resonator and an arrayed-waveguide grating.

8. The integrated photonic device according to claim 1, further comprising:
   a wavelength selective modulator, optically coupled to the first arm by a coupler adapted for coupling light of the first polarization from the first waveguide arm to light of the second polarization in the wavelength selective modulator;
   and wherein the dimensions of the first arm and the dimensions of the second arm are selected to substantially cancel wavelength drift of the wavelength selective modulator due to external effects.

9. The integrated photonic device according to claim 8, wherein the wavelength selective modulator is a ring modulator.

10. A method for reducing the sensitivity of action of an integrated photonic device having a wavelength-dependent characteristic on an input wave having a first polarization, the method comprising:
   splitting the input wave to provide a first wave having the first polarization and a second wave having a second polarization different from the first polarization;

propagating the first wave through a first waveguide arm in a first polarization mode;

propagating the second wave through a second waveguide arm in a second polarization mode;

combining the propagated first wave and the propagated second wave at an output side of the first arm and of the second arm to provide an output wave having an output polarization;

wherein the dimensions of the first waveguide arm and the second waveguide arm are selected to substantially cancel out the influence of an external effect on the wavelength-dependent characteristic.

11. The method according to claim 10, wherein the integrated photonic device is a wavelength filter, selected from the group consisting of a Mach-Zehnder interferometer (MZI), a ring resonator and an arrayed-waveguide grating, and wherein the wavelength-dependent characteristic is a transmission or filter characteristic of said wavelength filter.

12. The method according to claim 10, wherein the integrated photonic device further comprises a wavelength selective modulator optically coupled to the first arm; the method further comprising coupling light of the first polarization from the first waveguide arm to provide light of the second polarization in the wavelength selective modulator, the wavelength-dependent characteristic being a resonance wavelength of the wavelength selective modulator.

13. The method according to claim 10, wherein the first polarization is a Transverse Magnetic (TM) polarization and the second polarization is a Transverse Electric (TE) polarization.

14. The method according to claim 10, wherein the first polarization is a Transverse Electric (TE) polarization and the second polarization is a Transverse Magnetic (TM) polarization.

15. The method according to claim 10, wherein the dimensions of the first waveguide arm and the dimensions of the second waveguide arm are selected to substantially cancel the influence of at least one effect selected from the group of dimension tolerances, radiation and temperature variations on an optical characteristic of the photonic device.

16. The method according to claim 15, where the optical characteristic is selected from a transmitted wavelength and a filtered wavelength.

17. The method according to claim 10, wherein the first waveguide arm and the second waveguide arm are part of a device selected from the group consisting of a Mach-Zehnder interferometer (MZI), a ring resonator and an arrayed-waveguide grating.

18. The device according to claim 1, wherein the output wave has the first polarization.

19. The device according to claim 1, wherein the SPR comprises a first waveguide and a second waveguide having a gap therebetween over a coupling length, the gap being sufficiently small to allow transfer of optical power between the first waveguide and the second waveguide, the width of the second waveguide being different from the width of the first waveguide.

* * * * *